3,375,119
METHOD OF PRESERVING FRESH MEAT
Said A. Assaf, 7136 S. Bennett, Chicago, Ill. 60649
No Drawing. Filed Oct. 22, 1963, Ser. No. 318,103
1 Claim. (Cl. 99—157)

This invention relates generally to the preservation of meat and is concerned more particularly with both compositions and methods for treating meat to preserve the desirable physical properties thereof.

In one specific aspect, the present invention relates to a composition and method for preventing the undesirable browning of fresh meat during storage.

In the mind of the modern consumer, the color of meat is equated with freshness. As a consequence, when expensive cuts of meat lose their bright red color, it becomes necessary to sell them at a reduced price or to incorporate them in formulated products; and it is generally recognized that there is a substantial economic loss to the meat industry each year as a result of the normal darkening of meat. Myoglobin has been determined to be the only meat pigment present in large enough quantities to color the muscle tissue; and in a living animal or in the surface tissues of freshly cut meat, myoglobin is present as oxy-myoglobin, the compound which is responsible for the characteristic bright red color. However, shortly after exposure to light and air, the surfaces of fresh meat undergo an oxygen exchange; and the bright red oxy-myoglobin becomes an undesirable brownish red pigment, met-myoglobin. In addition, frozen meat is known to darken more rapidly than refrigerated meat due at least in part to the rupture of cells during the freezing procedure.

The present invention is based on the discovery that meat can be prevented from browning and its color stabilized by infusing into the surface tissues both a mixture of the metal ions normally found in biological tissue and sufficient alkali to raise the pH of the treated tisues to a value of 6.8 or above.

Therefore, an important object of the present invention is to provide a composition and method for treating meat so as to prevent browning and promote a stable red color.

A more general object of the invention is to provide a composition and method for preserving the desirable physical qualities of meat.

Another object of the invention is to provide a composition and method for treating meat to extend its permissible storage life.

Still another object of the invention is to provide a novel composition for adding to meat and meat products which does not harm the meat or meat product and which is safe to ingest.

And still another object of the invention is to provide a composition for adding to meat and meat products which itself is not a pigment but which may be added to meat and meat products to promote a stable red color.

These and other objects and features of the invention will become more apparent from a consideration of the following descriptions.

The meat treating composition of the invention can be prepared from musicle tissue; and in accordance with one method of producing the composition of the invention, a solution containing certain important ingredients of the composition is first prepared according to the procedure suggested by Lane and Bratzler in "Journal of Food Science," 27, p. 343. Specifically, fresh lean meat, for example, hanging tenderloin of beef or round of beef, is homogenized in deionized distilled water; and the resultant meat-water slurry is filtered and subsequently centrifuged. These procedural steps are performed in a room and with materials maintained at approximately 3° C. in order that the supernatant liquid which is ultimately withdrawn from the centrifuging operation may contain a crude myoglobin extract as well as certain important ingredients of the instant composition. It will be obvious then that these ingredients of the instant composition are present in the water soluble fraction of fresh lean meat, the composition being therefore safe to ingest because of its source in a common food.

The supernatant liquid from the centrifuging operation is dialyzed against water using conventional, cellulose dialysis tubing, such as that which is commercially available from the Visking Company, Chicago, Ill., a division of the Union Carbide Corporation. In performance of the dialysis, the supernatant liquid from the centrifuging procedure is filled into the dialysis tubing which is then placed in a vessel filled with cold deionized water, the water being approximately 3° C. The dialyzate contains certain ions which form important constituents of the composition of the invention; and thus, it will be recognized that these constituents are both water soluble and dialyzable.

The dialyzate is then concentrated, and either vacuum or heat evaporation may be employed. This dewatering of the dialyzate is continued until a very concentrated solution is obtained. The resultant residue is then incinerated at 550° C. for approximately 12 hours until a white ash is obtained, the whiteness of the ash indicating absence of organic substances. The ash which is obtained in this manner contains the metal ions of the instant composition; and in order to provide a convenient form of the composition for treating meat, the ash is dissolved in water and the insoluble portions of the ash dispersed in the resultant solution. Alternatively, the ash may be dissolved completely with hydrochloric acid and the resultant solution neutralized with a dilute solution of a strong base. When water is used as the solvent for the ash, the resultant solution is naturally alkaline; but when hydrochloric acid is used as a solvent for the ash, it is necessary to add a hydrogen ion acceptor such as sodium hydroxide or potassium hydroxide in order to develop an alkaline reagent.

The alkaline reagent which is produced from the ashed dialyzate is employed in treating meat to preserve its desirable physical properties and especially to prevent the characteristic darkening of the meat. Hypodermic syringes may be employed in injecting the reagent into the surface tissues of the cuts of meat which are to be treated or into meat carcasses or animals being prepared for slaughter. Alternatively, the cuts of meat may be dipped in the reagent; and cuts of meat in either the freshly butchered or the lyophilized state may be treated in this manner. In addition, the surface of meat may be treated by brushing or rolling the reagent onto the surface of the meat. As will be recognized, a sufficient amount of the ashed dialyzate is added to produce the effect which is desired; and it has been found that maximum effects are obtained if sufficient alkali is present to raise the pH of at least the surface tissues of the meat to a value of 6.8 or above and advantageously between a pH of 6.8 and 13.0, meat normally having a pH of 5.8 to 6.2.

After the meat has been treated it is stored in the usual manner under refrigerated conditions, or it is frozen and held in frozen storage. Steaks which have been treated in accordance with the invention display a desirable red color after being frozen and then continuously exposed to white fluorescent light at an intensity of 100 footcandles for several weeks. Under the same conditions, untreated steaks develop a dark reddish brown color in the same time.

As mentioned hereinabove, the supernatant liquid from the described centrifuging operation has been found to contain the red meat pigment, myoglobin; and when quantities of this supernatant liquid are made alkaline to a pH of 6.8 or above, addition of quantities of the ashed dialyzate have been found to stabilize the myoglobin pigment. While it is not desired to be limited to any theory, it is believed that the pigment stabilization which is achieved by the instant invention results from the development of a stable, alkaline form of met-myoglobin. This theory conforms with the facts which have been determined; and confirmation has been found in the spectrophotometric identification of two types or forms of metare present and the proportions have been found to be sufficiently similar for the purposes of the invention. Table I sets forth the principal metals found in an ashed dialyzate of beef, and these concentrations are compared with other meats, vegetable sources and certain seafoods. Metals other than those listed in Table I have been detected in meat and other biological tissues. These metals include cobalt, selenium, rubidium, strontium, zirconium, indium, tin, tellurium, cesium, barium, cerium, hafnium and uranium. Trace elements present include ruthenium, platinum, yttrium and europium.

Alternative methods of treatment are also contemplated. For example, the ashed dialyzate, being itself alkaline, may be rubbed directly on the surfaces of meat, in which case the natural juices of the meat are relied upon to dissolve and disperse the metal ions and the alkaline factor. Moreover, meat packaging materials may be coated with the composition of the invention, alone or mixed with a suitable food gum, such as gum tragacanth; and either the outside surface or the inside surface of the packaging material may be coated. When the outside surface of the packaging material is coated, it is valuable to draw a vacuum on the package in order to cause passage of the ash composition through the packaging material. Furthermore, other solvents for the composition are possible. Propylene glycol may be used as a carrier for a water solution of the ashed dialyzate, for example.

TABLE I.—METAL ION CONCENTRATION IN VARIOUS BIOLOGICAL SOURCES
[Values in p.p.m.]

| Metal | Concentration in Muscle Tissue | | | | | | | | Conc. in Ashed Dialyzate Beef [1] | Wheat [2] | Garden Pea [2] | Sugar Cane [3] | Salmon (Bulk) | Oyster (Bulk) |
|---|---|---|---|---|---|---|---|---|---|---|---|---|---|---|
| | Chicken | | Beef | | Pork | | Ham | | | | | | | |
| | Ash | Bulk | Ash | Bulk | Ash | Bulk | Ash | Bulk | | | | | | |
| P | $2.0 \times 10^5$ | $1.2 \times 10^3$ | $3.8 \times 10^5$ | $3.6 \times 10^3$ | $2.0 \times 10^5$ | $9.2 \times 10^2$ | $5.2 \times 10^4$ | $1.0 \times 10^3$ | $8.9 \times 10^5$ | $0.3 \times 10^4$ | $3.4 \times 10^3$ | $5.2 \times 10^3$ | $2.3 \times 10^3$ | $1.4 \times 10^3$ |
| K | | | $3.5 \times 10^5$ | $3.5 \times 10^3$ | | | | | $6.0 \times 10^5$ | $2.8 \times 10^4$ | $1.0 \times 10^4$ | $1.5 \times 10^4$ | $3.4 \times 10^3$ | |
| Na | | | $2.3 \times 10^4$ | $6.5 \times 10^2$ | | | | | $9 \times 10^4$ | | $3.8 \times 10^2$ | | $1.2 \times 10^3$ | |
| Mg | | | $2.6 \times 10^4$ | $2.1 \times 10^2$ | | | | | $9 \times 10^4$ | $0.1 \times 10^4$ | $0.5 \times 10^4$ | $0.3 \times 10^4$ | $3.2 \times 10^2$ | |
| Ca | | $1.4 \times 10^2$ | $1.3 \times 10^4$ | $1.0 \times 10^2$ | | $1.0 \times 10^2$ | | $0.9 \times 10^2$ | $2.5 \times 10^4$ | $0.8 \times 10^4$ | $1.5 \times 10^4$ | $0.4 \times 10^4$ | $1.7 \times 10^2$ | $9.4 \times 10^2$ |
| Fe | $2.1 \times 10^4$ | $1.3 \times 10^2$ | $6.0 \times 10^3$ | 48 | $4.2 \times 10^3$ | 19 | $3.9 \times 10^3$ | 23 | $4.4 \times 10^3$ | $4.3 \times 10^2$ | | $3.7 \times 10^2$ | 9 | 56 |
| Zn | $1.7 \times 10^3$ | 11 | $2.1 \times 10^3$ | 17 | $3.0 \times 10^3$ | 14 | $4.8 \times 10^2$ | 9.5 | $4 \times 10^3$ | 17 | | | | |
| Al | | | $5 \times 10^2$ | 0.5 | | | | | $8 \times 10^3$ | | | | | |
| Cu | | | 250 | 2.0 | | 3 | | | $6.8 \times 10^2$ | 8 | 14 | | | |
| Mn | | | 220 | 1.7 | | | | | $4.6 \times 10^2$ | | 15 | 30 | | |
| B | | | 13 | 1.0 | | | | | $8 \times 10^2$ | 7 | 18 | | | |
| Mo | | | 11 | 0.9 | | | | | 30 | | | | | |

[1] The ash was melted over hot flame and then dissolved in 10% HCl.  [2] Dry material, shoots.  [3] Dry material, leaves.

myoglobin. The brown acidic form of met-myoglobin which is commonly found in meat has absorption peaks at 580, 633, 498 and 409 millimicrons, the peak at 580 millimicrons being due perhaps to an admixture of oxymyoglobin. On the other hand, the hydroxy form of met-myoglobin displays absorption peaks at 580, 542 and 414 millimicrons. Hydroxy-met-myoglobin has proved to be a stable red pigment, and it is believed that the incorporation of the ashed dialyzate with myoglobin in an alkaline environment forms one or more complexes between the pigment and one or more of the metal ions present. In any event, the stability of hydroxy-met-myoglobin in the presence of the metal ions of the ashed dialyzate is highly useful in preserving a red color in various meats. While all meats benefit from treatment, particular advantage is derived in the case of ham and salmon.

The meat treating composition of the invention may be produced by methods other than that which has been described hereinabove. For example, a solution of metal hydroxides can be developed which contains approximately the same metal ions in approximately the same concentration as is found in the described ashed dialyzate. In addition, ash from other biological sources, such as fish and vegetables, may be employed; and while the concentration of the several metals may vary according to the specific biological source, the same chemical elements The composition and treatment method of the invention have beneficial effects on properties of meat other than color. Specifically, the preservative composition and treatment of the invention tend to improve juiciness, suppress both rancidity and the development of off-flavors, and promate desirable water and fat binding characteristics. Furthermore, the composition of the invention may be added to cured meat at low hydrogen ion concentration to effectuate a color and flavor improvement, it being theorized that this latter procedure develops a stable, acidic nitrosomyoglobin pigment. Treatment with alkali alone so as to raise the pH of the surface tissues of meat to a level of 6.8 or above has some beneficial results without incorporation of the metal ions found in the ashed diffusate described hereinabove. A 0.2 N solution of sodium or potassium hydroxide is used in this latter situation.

It will be apparent that many widely different embodiments of this invention may be made without departing from the spirit and scope thereof; and therefore, it is not intended to be limited except as indicated in the appended claim.

I claim:
1. The method of preserving the desirable characteristics of fresh meat which comprises the steps of: dialyzing a slurry of meat and water; concentrating and ashing the diffusate from the dialysis; and contacting at least the surface tissues of meat with the resultant ash and sufficient alkali to raise the pH of said surface tissues to a value of from approximately 6.8 to approximately 13.0.

References Cited

UNITED STATES PATENTS

| | | | |
|---|---|---|---|
| 775,066 | 11/1904 | Jacobs | 99—222 |
| 868,566 | 10/1907 | Hughes | 99—222 X |
| 1,039,873 | 10/1912 | Wilson | 99—222 |
| 2,641,544 | 6/1953 | Parker | 99—229 X |
| 2,668,770 | 2/1954 | Hall | 99—222 |
| 2,789,914 | 4/1957 | Davis | 99—229 |
| 2,969,291 | 1/1961 | Simerl | 99—157 X |
| 3,134,678 | 5/1964 | Wierbicki et al. | 99—159 |
| 3,062,655 | 11/1962 | Staackmann et al. | 99—107 X |

FOREIGN PATENTS

| | | |
|---|---|---|
| 1,079 | 1855 | Great Britain. |

OTHER REFERENCES

Kaufmann: "Sodium Chloride," Reinhold Publishing Corp., New York, TN900 K36, pp. 275, 276, and 277.

Lane et al.: "Journal of Food Science," vol. 27, No. 4, pp. 343, 344 and 345.

Lepper: "Official and Tentative Methods of Analysis of the Association of Official Agricultural Chemists," 1945, published by Association of Official Agricultural Chemists, P.O. Box 540, Benjamin Franklin Station, Washington, D.C., (587 A7, 1945), pp. 421 and 422, sec. 28.5.

HYMAN LORD, *Primary Examiner.*